(12) United States Patent
Tomita et al.

(10) Patent No.: US 8,768,527 B2
(45) Date of Patent: Jul. 1, 2014

(54) POWER DEMAND-SUPPLY MANAGEMENT SERVER AND POWER DEMAND-SUPPLY MANAGEMENT SYSTEM

(75) Inventors: Yasushi Tomita, Mito (JP); Yasuo Sato, Chiba (JP); Masahiro Watanabe, Hitachi (JP); Rena Tachihara, Tokyo (JP); Yuichi Otake, Kawasaki (JP); Tatsuya Yamada, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 523 days.

(21) Appl. No.: 13/061,202

(22) PCT Filed: Jan. 8, 2010

(86) PCT No.: PCT/JP2010/050155
§ 371 (c)(1),
(2), (4) Date: Jul. 28, 2011

(87) PCT Pub. No.: WO2010/082536
PCT Pub. Date: Jul. 22, 2010

(65) Prior Publication Data
US 2011/0282505 A1 Nov. 17, 2011

(30) Foreign Application Priority Data
Jan. 13, 2009 (JP) .................................. 2009-004393

(51) Int. Cl.
*G05D 17/00* (2006.01)
(52) U.S. Cl.
USPC ............................ 700/291; 700/295; 705/412
(58) Field of Classification Search
CPC ............... Y04S 20/224–20/225; Y02B 70/30; Y02B 70/3225; Y02B 70/3233; Y02B 70/343; G06Q 50/06; H02J 2003/007; G05B 13/04; G05B 13/042; G05B 13/048
USPC ............... 700/22, 28–40, 286, 291, 295–299; 705/80, 412
See application file for complete search history.

(56) References Cited

U.S. PATENT DOCUMENTS

| | | | | |
|---|---|---|---|---|
| 5,115,967 A | * | 5/1992 | Wedekind | 236/46 R |
| 5,924,486 A | * | 7/1999 | Ehlers et al. | 165/238 |
| 6,439,469 B1 | * | 8/2002 | Gruber et al. | 237/8 R |
| 6,785,592 B1 | * | 8/2004 | Smith et al. | 700/291 |
| 6,785,630 B2 | * | 8/2004 | Kolk et al. | 702/130 |
| 2005/0192680 A1 | * | 9/2005 | Cascia et al. | 700/29 |

(Continued)

FOREIGN PATENT DOCUMENTS

| | | | | | |
|---|---|---|---|---|---|
| JP | 2002-271981 A | * | 9/2002 | | H02J 3/00 |
| JP | 2002-369385 A | * | 12/2002 | | H02J 3/00 |
| JP | 2006-074952 A | * | 3/2006 | | H02J 3/00 |

*Primary Examiner* — M. N. Von Buhr
(74) *Attorney, Agent, or Firm* — Antonelli, Terry, Stout & Kraus, LLP.

(57) ABSTRACT

A power demand/supply management server (10) obtains information defining restraint contents to a comfort and an electricity bill from a consumer power operating device (2). An individual-consumer control optimizing unit of the power demand/supply management server (10) calculates control contents to an electrical equipment having a minimum cost evaluation value based on a simulation result of cost evaluation values which are barometers for evaluating a comfort and an electricity bill excessiveness, and transmits the calculated control contents to the consumer power operating device (2). Also, a whole-consumer optimizing unit of the power demand/supply management server (10) calculates the most appropriate electricity unit meter-charge that ensures a necessary demand suppression plan level throughout the whole power system based on an electricity daily load curve for each consumer.

8 Claims, 8 Drawing Sheets

(56) References Cited

U.S. PATENT DOCUMENTS

| | | |
|---|---|---|
| 2006/0065750 A1* | 3/2006 | Fairless ................. 236/46 R |
| 2007/0005191 A1* | 1/2007 | Sloup et al. ............. 700/276 |
| 2007/0255461 A1* | 11/2007 | Brickfield et al. ........ 700/295 |
| 2008/0172312 A1* | 7/2008 | Synesiou et al. ........... 705/34 |
| 2008/0281473 A1* | 11/2008 | Pitt ........................ 700/291 |
| 2009/0295594 A1* | 12/2009 | Yoon .................... 340/825.36 |
| 2011/0231320 A1* | 9/2011 | Irving ....................... 705/80 |

* cited by examiner

| Restraint subject | | Range | | Cost evaluation value |
|---|---|---|---|---|
| Equipment | Parameter | Lower limit | Upper limit | |
| Air conditioner | Set temperature (°C) | 35 | — | 100 |
| | | 30 | 35 | 80 |
| | | 25 | 30 | 60 |
| | | 23 | 25 | 20 |
| | | 21 | 23 | 0 |
| | | 19 | 21 | 0 |
| | | 17 | 19 | 20 |
| | | 15 | 17 | 30 |
| | | 10 | 15 | 80 |
| | | — | 10 | 100 |
| Lighting equipment | Lighting rate (%) | 80 | 100 | 0 |
| | | 60 | 80 | 20 |
| | | 40 | 60 | 40 |
| | | 20 | 40 | 50 |
| | | 0 | 20 | 60 |
| Electric vehicle | Charging current rate (%) | 80 | 100 | 0 |
| | | 60 | 80 | 10 |
| | | 40 | 60 | 20 |
| | | 20 | 40 | 20 |
| | | 0 | 20 | 20 |
| | Charging termination continuous time (minute) | 40 | — | 200 |
| | | 30 | 40 | 150 |
| | | 20 | 30 | 100 |
| | | 10 | 20 | 50 |
| | | 0 | 10 | 0 |

| Annual meter-charge target value | Target excessive cost | | |
|---|---|---|---|
| | Excessive rate (%) | | Cost Evaluation value |
| | Lower limit | Upper limit | |
| One million yen | 100 | — | 1000 |
| | 50 | 100 | 1000 |
| | 30 | 50 | 1000 |
| | 20 | 30 | 1000 |
| | 10 | 20 | 400 |
| | 5 | 10 | 200 |
| | 0 | 5 | 100 |
| | — | 0 | 30 |

FIG.4

| Applied-period | | Control subject information | | Control target information | | |
|---|---|---|---|---|---|---|
| Start | End | Equipment | Control element | Start time | End time | Control target value |
| 6/1 | 9/30 | Air conditioner | Set temperature(°C) | 9:00 | 13:00 | 28 |
| | | Air conditioner | Set temperature(°C) | 13:00 | 14:00 | 30 |
| | | Air conditioner | Operation On/Off | 14:00 | 15:00 | Off |
| | | Air conditioner | Set temperature(°C) | 15:00 | 16:00 | 30 |
| | | Air conditioner | Set temperature(°C) | 16:00 | 18:00 | 28 |
| | | Electric vehicle | Charging On/Off | 12:00 | 15:00 | Off |
| 10/1 | 11/30 | ... | ... | | ... | |
| 12/1 | 2/28 | ... | ... | | ... | |
| 3/1 | 5/31 | ... | ... | | ... | |

481  482  483  48

POWER DEMAND-SUPPLY MANAGEMENT SERVER AND POWER DEMAND-SUPPLY MANAGEMENT SYSTEM

BACKGROUND OF THE INVENTION

1. Field of the Invention

The present invention relates to a power demand/supply management server and a power demand/supply management system.

2. Description of the Related Arts

The most important concern when managing and controlling a power system is that the availability becomes poor. In this case, an action of temporarily suppressing the power consumption of consumers is taken in some cases.

For example, a utility company in California, U.S.A, provides a program that is so-called a "demand response" to their consumers. Such a program has various types, and for example, a program called a Critical Peak Pricing (CPP) functions as follows.

That is, participants to this program sign on with the utility company beforehand. The participants take application of a preferential rate having the electricity unit meter-charge set inexpensive. Everyday, the utility company decides whether or not to set the next day as a CPP event day, and when setting the next day as the CPP event day, notifies the participants of information that the next day will be the CPP day a day ahead.

Next, the unit meter-charge of the peak hours (12:00 to 18:00) at the CPP event day is set expensive (e.g., five times as much as a normal day). In order to avoid increasing of the electricity charge during the peak hours at the CPP event day and to ensure an advantage of reducing the annual electricity bill through the application of the preferential rate for other hours, the participants avoid using electrical equipment during the peak hours at the CPP event day and take an action of suppressing the electrical power consumption (see, for example, non-patent literature 1). More specifically, for example, a set temperature of an air conditioner is risen.

According to such CPP, adjustment of the use of electrical equipment at the side of participants is a manual operation. Accordingly, such an operation at the side of participants is bothersome every time a CPP event happens, and there is a concern that the electrical-power-consumption suppressing action remains uncertain.

Hence, a program so-called an Auto Demand Response (Auto-DR) is provided so far. According to the Auto-DR, a server that delivers a CPP event signal for notification of a CPP event day is provided at the side of utility company. Also, an equipment that receives the CPP event signal and a system that controls electrical equipment through a CPP event compatible control logic set beforehand in accordance with the CPP event signal are provided at the side of participants, thereby making operations automated from a CPP event delivery to an electrical equipment control (see, for example, non-patent literature 2).

PRIOR ART DOCUMENT

Non-Patent Literatures

Non-patent Literature 1: Critical Peak Pricing Rate Schedule, DataSheet. [online]. Southern California Edison. [retrieved on 2008 Nov. 18]. Retrieved from the Internet: <URL: http://www.sce.com/NR/rdonlyres/B73F4175-162B-4C4F-B953-4E0A94863390/0/08June_CPPFactSheet.pdf>.

Non-patent Literature 2: Automated Demand Response. DataSheet. [online]. Southern California Edison. [retrieved on 2008 Nov. 18]. Retrieved from the Internet: <URL:http://www.sce.com/NR/rdonlyres/08EBB404-C15D-4FD1-ABBD-E364A82C2A57/0/2008_0201_AutoDRFactSheet.pdf>.

According to the above-explained Auto-DR program, once the CPP event compatible control logic is set, the bothersome operation every time a CPP event happens can be eliminated, and the electrical-power-consumption suppressing action can be automatically and surely taken.

However, the electrical power consumption by electrical equipment depends on weather conditions like a temperature, so that it is still uncertain whether or not the electrical-power-consumption suppression by the CPP event compatible control logic and the effect of reducing the electricity bill inherent to such suppression are ensured as expected. On the other hand, when a large level of suppression is performed in order to ensure the effect, there is a concern that the user-friendliness of the user and the comfort (hereinafter, collectively referred to as a comfort) thereof become poor. Also, regarding the plans of generating electricity by the utility company, etc., such plan is made based on a demand forecasting value, so that if the electrical-power-demand suppression level at the time of CPP event is not forecasted precisely, such a poor forecasting largely affects the plans.

SUMMARY OF THE INVENTION

The present invention has been made in order to overcome the foregoing problems, and it is an object of the present invention to provide a power demand/supply management server and a power demand/supply management system which can minimize an effect to a comfort while allowing individual consumers to accomplish a goal of saving money on electricity, and which can ensure an appropriate demand suppressing plan level of a whole power system.

In order to overcome the above-explained problem, according to a power demand/supply management server and a power demand/supply management system of the present invention, the power demand/supply management server that has obtained information defining restraint contents to the comfort of the consumer and an electricity bill simulates cost evaluation values which are barometers for evaluating the comfort and an electricity bill excessiveness, calculates control contents to the electrical equipment having the minimum cost evaluation value, and distributes such control contents to the consumer. Also, the power demand/supply management server calculates an electricity unit meter-charge which ensures a necessary demand suppression plan level as a whole power system based on an electricity daily load curve of each consumer.

According to the present invention, there are provided a power demand/supply management server and a power demand/supply management system which can minimize an effect to a comfort while allowing individual consumers to accomplish a goal of saving money on electricity, and which can ensure an appropriate demand suppressing plan level of a whole power system.

BRIEF DESCRIPTION OF DRAWINGS

FIGS. 3A and 3B are diagrams showing a data structure of control preference data according to the embodiment;

FIG. 4 is a diagram showing an illustrative data structure of an electrical equipment control table according to the embodiment;

DETAILED DESCRIPTION OF THE PREFERRED EMBODIMENTS

Next, an explanation will be given of an embodiment of the present invention (hereinafter, referred to as an "embodiment") in detail with reference to the accompanying drawings.

Figure 1:
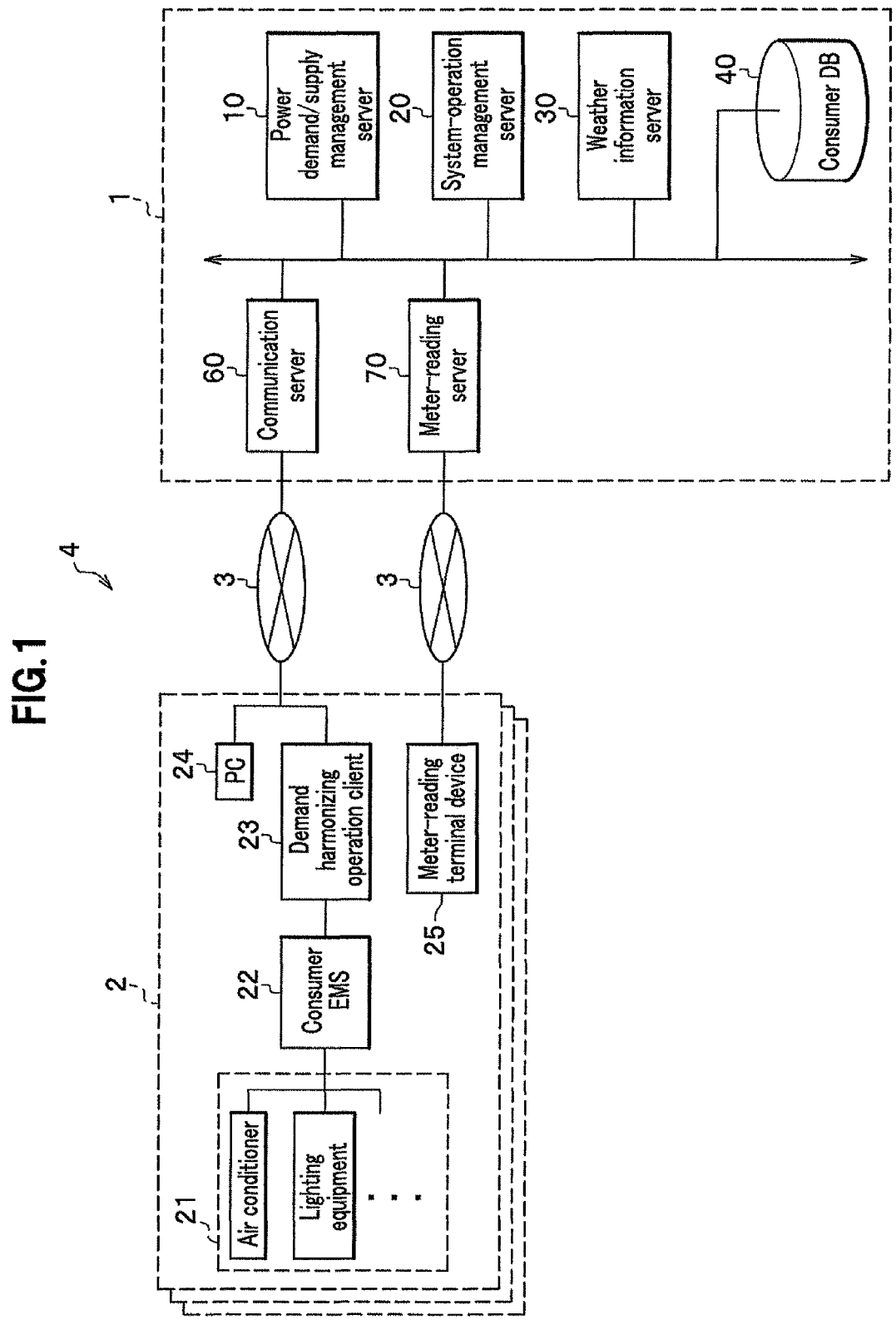
FIG. 1 is a functional block diagram showing an illustrative configuration of a power demand/supply management system according to an embodiment.

FIG. 1 is a functional block diagram showing an illustrative configuration of a power demand/supply management system 4 according to an embodiment.

As shown in FIG. 1, the power demand/supply management system 4 of the embodiment comprises a power management device 1 that is provided at a side of a utility company which supplies power to individual consumers, and a consumer power operation device (power operation device) 2 which is connected to the power management device 1 over a communication network 3 and which is provided at the side of each consumer.

The consumer power operating device 2 at the side of a consumer includes electrical equipment 21, a consumer EMS (Energy Management System) 22, a demand/supply harmonizing operation client 23, a PC (Personal Computer) 24, and a meter-reading terminal device 25.

The electrical equipment 21 includes devices subjected to a power consumption suppression at the consumer, such as an air conditioner, and a lighting equipment.

The consumer EMS 22 is a device that controls the electrical equipment 21, and for example, changes a set temperature of the air conditioner and turns on/off the air conditioner.

The demand/supply harmonizing operation client 23 receives information on an electricity unit meter-charge and a change thereof, and information (an "electrical equipment control table 48" shown in FIG. 4 to be discussed later) on the control of each electrical equipment 21 from the utility company, and passes those pieces of information to the consumer EMS 22. The consumer EMS 22 controls the electrical equipment 21 based on the electrical equipment control table 48 that is the best solution received by the demand/supply harmonizing operation client 23.

The PC 24 includes, for example, a keyboard, a display, and is an input/output device which accepts inputting of information necessary to control the electrical equipment and outputs a control result. The PC 24 exchanges information with the power management device 1 through the demand/supply harmonizing operation client 23 and the communication network 3.

The meter-reading terminal device 25 is a communication terminal device which collects meter-reading data on a power meter provided at a consumer, and which sends the collected data to the utility company.

Next, an explanation will be given of the power management device 1 at the side of utility company.

The power management device 1 includes a power demand/supply management server 10, a system-operation management server 20, a weather information server 30, a consumer DB (Data Base) 40, a communication server 60, and a meter-reading server 70.

The communication server 60 manages a communication of each server including the power demand/supply management server 10, the system-operation management server 20, etc., at the side of utility company with the demand/supply harmonizing operation client 23 and the PC 24 of the consumer power operating device 2 through the communication network 3.

The meter-reading server 70 communicates with the meter-reading terminal device 25 at the side of consumer through the communication network 3, and collects pieces of the meter-reading data of the power meter of the consumer.

The collected pieces of meter-reading data are stored in the consumer DB 40. It is possible to provide an individual database that stores meter-reading data, but in this embodiment, an explanation will be given of a case in which the consumer DB 40 stores those pieces of data.

The system-operation management server 20 manages the electric generating capacity of an electricity generator, etc., sets a demand suppression plan level of the whole power system, and supplies the plan to the power demand/supply management server 10.

The weather information server 30 stores past data on weather conditions, such as a temperature and a humidity location by location, and supplies a forecasting value relating to a future weather condition to the power demand/supply management server 10.

However, it is not necessary that the weather information server 30 be connected to the power demand/supply management system 4 according to this embodiment, and a user may manually input such data, and such data may be successively updated through a cooperation with a weather information system that is an external organization.

The consumer DB 40 stores data relating to the equipment of the consumer needing a power supply and setting of such equipment.

Figure 2:
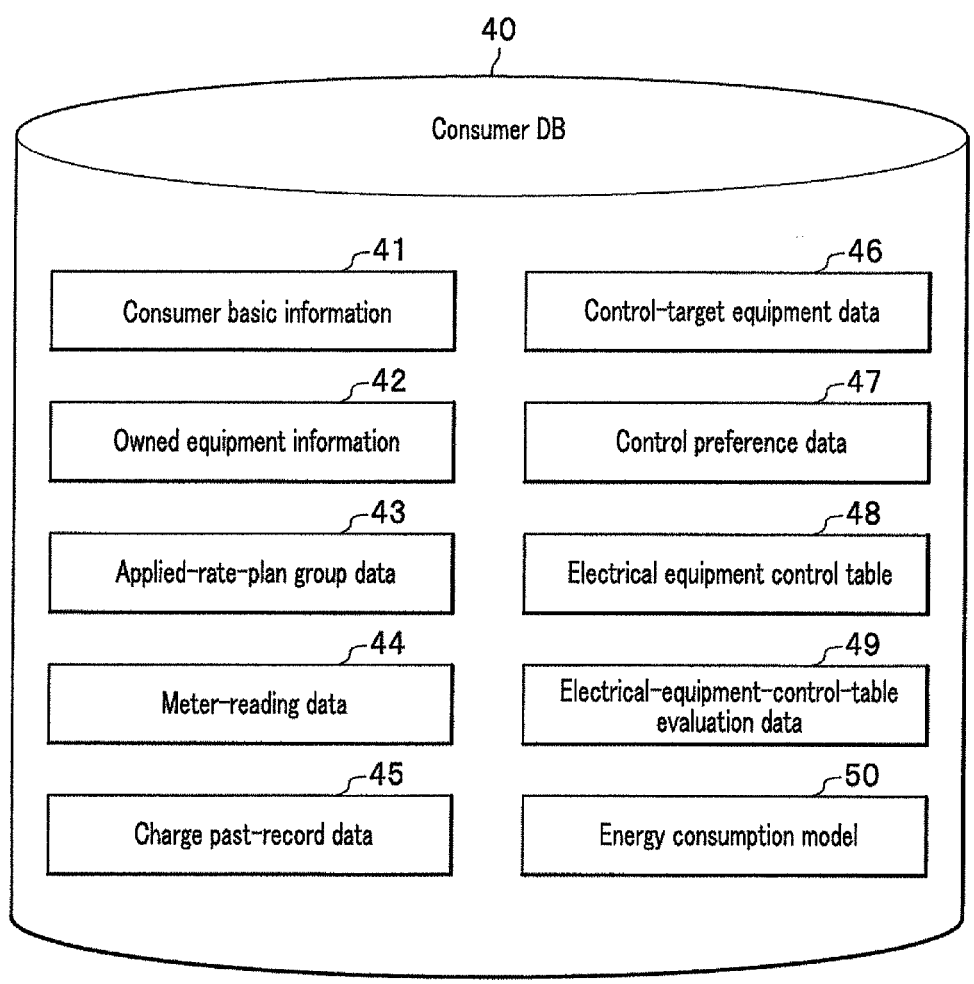
FIG. 2 is a diagram showing an illustrative data structure of a consumer DB according to the embodiment.

FIG. 2 is a diagram showing an illustrative data structure of the consumer DB 40 according to this embodiment.

As shown in FIG. 2, the consumer DB 40 includes consumer basic information 41, owned equipment information 42, applied-rate-plan group data (applied-rate-plan group information) 43, a meter-reading data 44, charge past-record data 45, control-target equipment data (control-target equipment information) 46, control preference data (control preference information) 47, the electrical equipment control table (electrical equipment control information) 48, electrical-equipment-control-table evaluation data 49, and energy consumption model 50.

The consumer basic information 41 includes stored data, such as the application of the building of a consumer, the scale, and the location.

The owned equipment information 42 includes stored data, such as the kind of equipment owned by the consumer, the capacity, the setting time, and hours in use.

The applied-rate-plan group data 43 includes unit charge data which contains plural kinds of rate plan data. Each rate plan data includes unit charge data which contains rate plan name data, hour classification data, data on electricity unit meter-charge per classified hour, and a basic rate data, and applied-period data which specifies the period of applying the unit charge data in a year.

The rate plan name data is a rate plan name set commonly throughout all consumers. That is, when the rate plan name of the rate plan name data included in the applied-rate-plan group data 43 applied to two consumers is same, the electricity unit meter-charge data of the rate plan data and the applied period data thereof corresponding to those consumers are same.

The meter-reading data 44 is transmitted from the meter-reading terminal device 25, and is meter-reading data of the power meter of each consumer received by the meter-reading server 70 through the communication network 3. For example, such data includes stored data representing a power consumption per 30 minutes, per hour classification, etc., of a consumer.

The charge past-record data 45 represents an electricity rate calculated based on the meter-reading data 44 and the applied-rate-plan group data 43.

The control-target equipment data 46 sets the electrical equipment 21 of each consumer subjected to the control by the power demand/supply management system 4 according to this embodiment.

The control preference data 47 defines a restriction condition relating to the comfort through an equipment control of each consumer and the electricity bill thereof.

FIGS. 3A and 3B are diagrams showing a data structure of the control preference data 47 according to this embodiment. FIG. 3A shows comfort restraint data 471, and FIG. 3B shows electricity bill restraint data 472. The comfort restraint data 471 and the electricity bill restraint data 472 have respective conditions relating to the comfort and the electricity bill in association with cost evaluation values which are values for evaluation with a uniform reference in the power demand/supply management server 10. The cost evaluation values are set beforehand by individual consumers, and the more the comfort is lost, or the more the cost increases, the higher the cost evaluation value becomes.

As shown in FIG. 3A, the comfort restraint data 471 has electrical equipment 21 subjected to restraint and a parameter thereof in association with a cost evaluation value within a range of the possible value of that parameter. Also, the comfort restraint data 471 has a table for each hour classification like per hour, and the maximum value of the cost evaluation value within each hour classification is taken as the cost evaluation value for the restraint target.

For example, in the case of the example shown in FIG. 3A, when the maximum set temperature of each air conditioner from 12:00 to 13:00 is between 23° C. to 28° C., the set temperature is across plural ranges in the table of the comfort restraint data 471 at 12:00 to 13:00, the higher cost evaluation value is taken, which is "60". However, when the set temperature is across plural ranges, an average value thereof may be taken.

Also, in the case of an electric vehicle, the cost evaluation values relating to two parameters: charging current rate; and a charging termination continuous time are set. The charging current rate is a ratio relative to, when the upper limit of a charging current at the time of charging for the electric vehicle can be controlled, the maximum value of the charging current. In the case of the example shown in FIG. 3A, when the maximum value of the charging current rate from 12:00 to 13:00 is 50%, the cost evaluation value becomes "20".

The charging termination continuous time is a time (minutes) while uncharging is continuous. In the case of the example shown in FIG. 3A, when the maximum charging termination continuous time from 12:00 to 13:00 is 30 minutes, the cost evaluation value becomes "100".

A value set as an upper limit corresponds to a range of parameter when the value thereof is equal to or lower than the former set value.

Next, the electricity bill restraint data 472 has data representing a target value of an annual meter charge and a cost evaluation value depending on the level of excessiveness from that target value in association with each other. In the case of the example shown in FIG. 3B, when the annual meter charge is 120 (hundred) million YEN, the target excessiveness rate is 20%, and a cost evaluation value becomes "400".

Returning to FIG. 2, the electrical equipment control table 48 is data defining the control contents to the electrical equipment 21 in a year at each consumer.

FIG. 4 is a diagram showing an illustrative data structure of the electrical equipment control table 48 according to this embodiment. As shown in FIG. 4, the electrical equipment control table 48 has control target information 482 and control contents information 483 in association with each other for each applied period 481. The control target information 482 includes information on the equipment subjected to a control and information on the control element thereof. The control contents information 483 includes data on a start time of an hour of reflecting a control, an end time thereof, and a control target value.

For example, in the case of the example shown in FIG. 4, during a period from June 1 to September 30, the set temperature of the air conditioner is set and controlled to be 28° C. from 9:00 to 13:00, be 30° C. from 13:00 to 14:00, be 30° C. from 15:00 to 16:00, and be 28° C. from 16:00 to 18:00. Also the operating condition of the air condition is Off from 14:00 to 15:00.

According to the electrical equipment control table 48, in the hours at which the control contents information 483 is defined, even if setting is made by a manual operation of the consumer, the setting in the electrical equipment control table 48 takes precedence. On the other hand, regarding the hours at which no control contents information 483 is defined, no control is performed on the electrical equipment 21.

Returning to FIG. 2, the electrical-equipment-control-table evaluation data 49 represents a result of an evaluation of an effect to a electricity daily load curve, an electricity bill, a comfort which is calculated by the power demand/supply management server 10 when the control contents to the electrical equipment 21 defined in the electrical equipment control table 48 are performed.

The electrical-equipment-control-table evaluation data 49 includes, for example, a electricity daily load curve per 30 minutes (hereinafter, referred to as a "electricity daily load curve per 30 minutes") formed by 48 pieces of power consumption data, an annual electricity bill (hereinafter, referred to as an "annual electricity bill") when unit meter charge per hour classification defined in the applied-rate-plan group data 43 is applied to the electricity daily load curve, a total value of cost evaluation values (hereinafter, referred to as a "comfort cost evaluation value") per control target defined in the comfort restraint data 471 in the control preference data 47, a cost evaluation value (hereinafter, referred to as an "electricity bill cost evaluation value") relative to the electricity bill restraint defined in the control preference data 47, and a total (hereinafter, referred to as a "total cost evaluation value") of the "comfort cost evaluation value" and the "electricity bill cost evaluation value".

The energy consumption model 50 is data defining a model for predicting a electricity daily load curve relative to the electrical-equipment control contents of each consumer, a weather condition, and an electricity unit meter-charge, etc.

For example, a following (formula 1) is an example model that predicts 48 pieces of power consumption per 30 minutes in a day from parameters, such as a weather condition (an external temperature), an air conditioner set temperature, and an electricity unit meter-charge per 30 minutes.

$$Yi = a1i \times ATi + a2i \times ATi \times ATi + b1i \times ACTi + b2i \times ACTi \times ACTi + c1i \times Pi + c2i \times Pi \times Pi + di \quad \text{(Formula 1)}$$

where:

$Yi$: power consumption (kWh) in i-th time division $ATi$: external temperature (° C.) in i-th time division $ACTi$: air conditioner set temperature) (° in i-th time division $Pi$: electricity unit meter-charge (YEN/kWh) in i-th time division $a1i$: primary coefficient relating to external temperature in i-th time division $a2i$: secondary coefficient relating to external temperature in i-th time division $b1i$: primary coefficient relating to air conditioner set temperature in i-th time division $b2i$: secondary coefficient relating to air conditioner set temperature in i-th time division $c1i$: primary coefficient relating to electricity unit meter-charge in i-th time division $c2i$: secondary coefficient relating to electricity unit meter-charge in i-th time division, and $di$: zero-order synthesized coefficient relating to external temperature, air conditioner set temperature, electricity unit meter-charge in i-th time division A power consumption can be calculated by substituting an external temperature, an air conditioner set temperature, and an electricity unit meter-charge in the right side of the (formula 1). In addition, an energy consumption model having the secondary items all eliminated, an energy consumption model including third items, etc., can be possible. Furthermore, models can be mixed and combined depending on a season and an hour.

<Power Demand/Supply Management Server>

Returning to FIG. 1, the power demand/supply management server 10 generates an energy consumption model based on the control contents to the electrical equipment 21 of the consumer power operating device 2, a weather condition, and an electricity unit meter-charge, etc.

The power demand/supply management server 10 simulates a electricity daily load curve, an annual electricity bill, and a total cost evaluation value, etc., using the generated energy consumption model and the control preference data 47 relating to a condition on the comfort of the consumer and an annual electricity bill, and generates the best electrical equipment control table 48.

Also, the power demand/supply management server 10 obtains an electricity unit meter-charge that can ensure the demand suppression plan level of the whole power system given from the system-operation management server 20 at requisite minimum.

Figure 5:
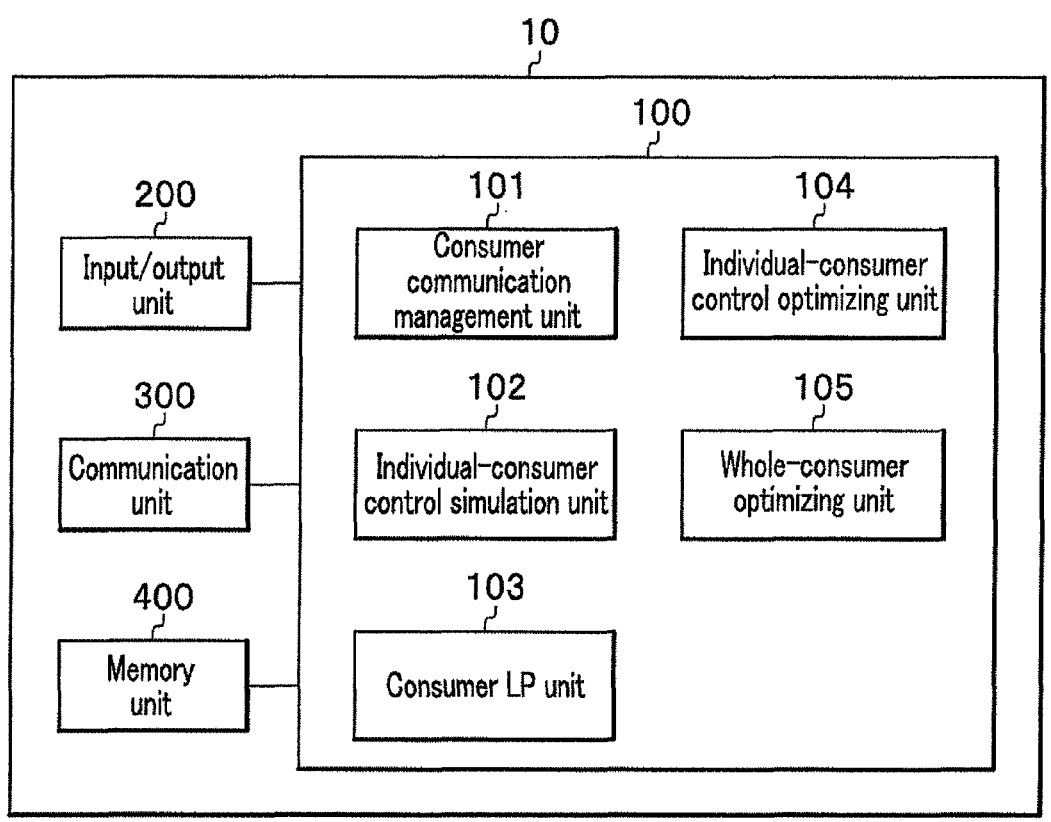
FIG. 5 is a functional block diagram showing an illustrative configuration of a power demand/supply management server according to the embodiment.

FIG. 5 is a functional block diagram showing an illustrative configuration of the power demand/supply management server 10 according to this embodiment.

As shown in FIG. 5, the power demand/supply management server 10 includes a control unit 100, an input/output unit 200, a communication unit 300, and a memory unit 400.

The input/output unit 200 is operated by the utility company at the time of transmission setting of change information on an electricity unit meter-charge and of the electrical equipment control table 48, and at the time of maintenance of the power demand/supply management server 10, or displays a process progression, and includes, for example, a keyboard and a display.

The communication unit 300 is a communication interface with the system-operation management server 20, the weather information server 30, the consumer DB 40, the communication server 60, the meter-reading server 70 all connected through a LAN (Local Area Network), or the consumer power operating device 2 connected through the communication server 60 and the communication network 3.

The memory unit 400 includes an auxiliary memory device like a hard disk, and a main memory like a RAM (Random Access Memory), and stores necessary information for the process by the control unit 100.

According to this embodiment, the above-explained consumer DB 40 is provided as an independent database server, but information in the consumer DB 40 may be stored in the memory unit 400.

The control unit 100 generates the best electrical equipment control table 48 which minimizes the effect to the comfort while ensuring an electricity bill saving target value, and calculates an appropriate electricity unit meter-charge so that the minimum requisite demand suppression plan level of the whole power system can be ensured. The control unit 100 includes a consumer communication management unit (a communication management unit) 101, an individual-consumer control simulation unit (a control simulating unit) 102, a consumer LP (Load Profiling) unit 103, an individual-consumer control optimizing unit 104, and a whole-consumer optimizing unit 105. The control unit 100 is realized by a CPU (Central Processing Unit) that runs and executes a program stored in the auxiliary memory device of the power demand/supply management server 10.

The consumer communication managing unit 101 causes the display unit of the PC 24 of the consumer power operating device 2 to display the setting screen of the control preference data 47 (see FIGS. 3A and 3B) and the electrical equipment control table 48 (see FIG. 4) through the communication unit 300 and the communication server 60. The consumer communication managing unit 101 also causes the display unit of the PC 24 to display an individual-consumer-control-optimizing-unit activation screen and an individual-consumer-control-simulating-unit activation screen, and to display the electrical equipment control table 48 and the electrical-equipment-control-table evaluation data 49 which are the process results. The consumer communication managing unit 101 obtains information relating to the control preference data 47 set and input by the PC 24 and to the electrical equipment control table 48 through the communication server 60, and stores those pieces of information in the consumer DB 40. Furthermore, the consumer communication managing unit 101 causes the input/output unit 200 of the power demand/supply management server 10 to display the whole-consumer-optimizing-unit activation screen.

More specifically, the consumer communication managing unit 101 displays, on the display unit of the PC 24, input screen in the formats shown in, for example, FIGS. 3A and 3B at the time of setting the control preference data 47.

In the case of the comfort restraint data 471 shown in FIG. 3A, in the fields of equipment subjected to restraint and the parameter both relating to the comfort, selection and specifying of candidates set beforehand for each consumer are prompted, and inputting and specifying of a corresponding range (lower limit and upper limit) and cost evaluation value are instructed. Also, in the case of the electrical bill restraint data 472 shown in FIG. 3B, respective fields of the annual meter-charge target value and the target excessive cost are inputted and specified by the consumer.

Also, the consumer communication managing unit 101 displays an input screen in the format of, for example, shown in FIG. 4 on the display unit of the PC 24 at the time of setting the electrical equipment control table 48.

Specifying of a date of the beginning of the applied period 481 and the end thereof, selection and specifying of candidates set beforehand for the equipment of the control target information 482 and the control element thereof, and selection and specifying of the time of the control contents information 483 and the control target value thereof are respectively prompted to the consumer.

Next, the consumer communication managing unit 101 displays, on the PC 24, the individual-consumer-control-optimizing-unit activation screen where an activation button of the individual-consumer control optimizing unit 104 is displayed, and the individual-consumer-control-simulating-unit activation screen where an activation button of the individual-consumer control simulating unit 102 is displayed. For example, upon clicking of the activation button, the consumer communication managing unit 101 receives clicking information through the communication network 3, and activates each process. The same is true of the whole-consumer-optimizing-unit activation screen on the input/output unit 200 of the power demand/supply management server 10. An activation button is displayed thereon, and upon receiving clicking information, the process by the whole-consumer optimizing unit 105 is activated.

The process by the whole-consumer optimizing unit 105 is not activated from the PC 24 at the consumer side, so that no activation button is displayed on the PC 24 at the consumer side. The system-operation management server 20 transmits a demand suppression plan to the whole-consumer optimizing unit 105, and instructs it to activate the process for that plan.

Furthermore, the consumer communication managing unit 101 transmits the best electrical equipment control table 48 that is the process result by the individual-consumer control optimizing unit 104 to the consumer power operating device 2 (to the PC 24 and the demand/supply harmonizing operation client 23) through the communication unit 300. Also, the electrical-equipment-control-table evaluation data 49 that is the process result by the individual-consumer control simulating unit 102 is transmitted to the consumer power operating device 2 (to the PC 24). Furthermore, the most appropriate electricity unit meter-charge that is the process result by the whole-consumer optimizing unit 105 is transmitted to the consumer power operating device 2.

Note that the consumer communication managing unit 101 has both functions as an information obtaining unit and a transmitting unit.

Next, the individual-consumer control simulating unit 102 simulates, using the energy consumption model 50 (see FIG. 2) consumer by consumer generated by the consumer LP unit 103, an electricity daily load curve, an annual electricity bill, a comfort cost evaluation value, an electricity bill cost evaluation value, and a total cost evaluation value when the target consumer executes the control contents to the electrical equipment 21 stored in the electrical equipment control table 48.

The process by the individual-consumer control simulating unit 102 will be explained in more detail later with reference to FIG. 7.

The consumer LP unit 103 generates an energy consumption model 50 for predicting an electricity daily load curve using parameters which are the control contents to the electrical equipment 21 of the consumer, a weather condition, and an electricity unit meter-charge in order to allow the individual-consumer control simulating unit 102 to execute the above-explained simulation.

More specifically, the constitutional formula of an energy consumption model 50 like the above-explained (formula 1) is set beforehand, and a process of setting the coefficients of such a formula through a regression analysis is executed so that an error becomes minimum using past actual record data on an electrical-equipment control contents at each consumer, a weather condition (an external temperature), an electricity unit meter-charge, and the electricity daily load curve, etc.

The individual-consumer control optimizing unit 104 generates an electrical equipment control table 48 that maximally satisfies the conditions defined in the control preference data 47 stored in the consumer DB 40.

More specifically, the individual-consumer control optimizing unit 104 takes control preference data 47 stored in the consumer DB 40 for a target consumer, changes and sets the control contents to the equipment defined in the electrical equipment control table 48 at random. Next, an electrical equipment control table 48 having the minimum total cost evaluation value calculated by the individual-consumer control simulating unit 102 is selected as the best solution.

The process by the individual-consumer control optimizing unit 104 will be explained in more detail later with reference to FIG. 6.

The whole-consumer optimizing unit 105 receives information on a demand suppression plan level from the system-operation management server 20 (see FIG. 1), and calculates the most appropriate electricity unit meter-charge that can ensure a demand suppression plan level of the whole power system at requisite minimum based on the electricity daily load curve of each consumer output by the individual-consumer control simulating unit 102. Also, the whole-consumer optimizing unit 105 transmits the calculated electricity unit meter-charge to the consumer power operating device 2 at each consumer through the consumer communication managing unit 101.

The process by the whole-consumer optimizing unit 105 will be explained in more detail later with reference to FIG. 8.

Next, with reference to FIGS. 1 and 5, an explanation will be given of a process by the power demand/supply management system 4 according to this embodiment along FIGS. 6 to 8.

<Process by Individual-Consumer Control Optimizing Unit>

Figure 6:
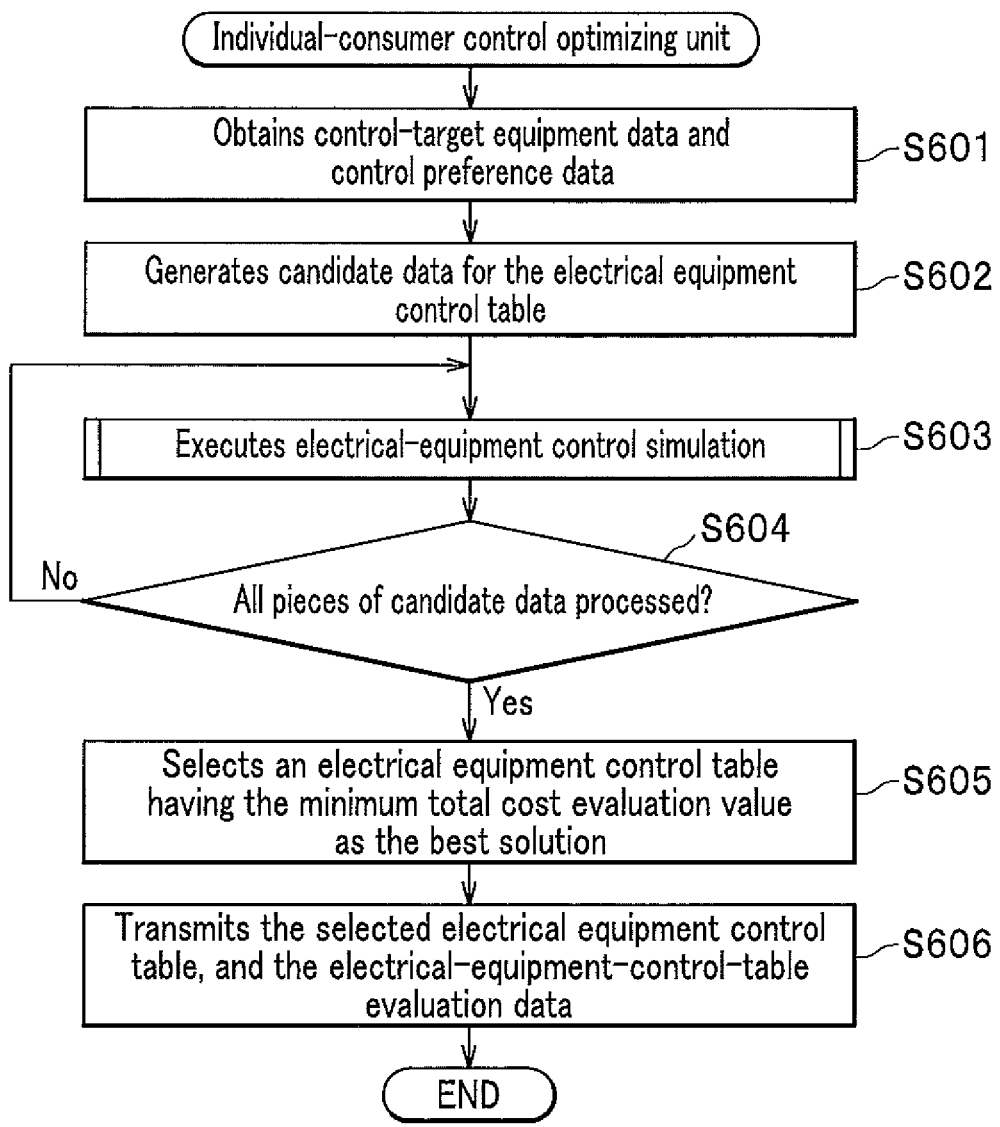
FIG. 6 is a flowchart showing a flow of a process by an individual-consumer control optimizing unit in the power demand/supply management server according to the embodiment.

FIG. 6 is a flowchart showing a flow of a process by the individual-consumer control optimizing unit 104 in the power demand/supply management server 10 according to this embodiment.

The individual-consumer control optimizing unit 104 executes a process of generating an electrical equipment control table 48 that maximally satisfies conditions defined in the control preference data 47 and electrical-equipment-control-table evaluation data 49 for each target consumer.

First, the individual-consumer control optimizing unit 104 obtains the control-target equipment data 46 of the target consumer and the control preference data 47 (see FIGS. 3A and 3B) from the consumer DB 40 (see FIG. 2) (step S601).

Regarding the control-target equipment data 46 and the control preference data 47, setting and inputting are already prompted to the consumer through the PC 24 of the consumer power operating device 2 by the consumer communication managing unit 101 (see FIG. 5), and information of such setting and inputting are stored in the consumer DB 40 after the setting and inputting given by the consumer.

Next, the individual-consumer control optimizing unit 104 generates candidate data for the electrical equipment control table 48 (step S602).

More specifically, the individual-consumer control optimizing unit 104 generates plural pieces of candidate data for the electrical equipment control table 48 at random each including information which are a control time (a start time and an end time) of the electrical equipment 21 defined in the control-target equipment data 46 for the target consumer and a control target value.

Next, the individual-consumer control optimizing unit 104 executes electrical-equipment control simulation at a calculation target date (step S603).

The individual-consumer control optimizing unit 104 passes each piece of candidate data of the electrical equipment control table 48 generated in the step S602 to the individual-consumer control simulating unit 102 and instructs the individual-consumer control simulating unit to execute simulation. Next, the individual-consumer control optimizing unit 104 receives an electricity daily load curve per 30 minutes, an annual electricity bill, a comfort cost evaluation value, an electricity bill cost evaluation value, and a total cost evaluation value for each candidate data as the simulation results by the individual-consumer control simulating unit 102. The detail of the simulation by the individual-consumer control simulating unit 102 will be explained later with reference to FIG. 7.

The individual-consumer control optimizing unit 104 determines whether or not all pieces of candidate data for the electrical equipment control table 48 generated in the step S602 are processed (step S604). When there is candidate data for the electrical equipment control table 48 not processed yet (step S604: NO), the process returns to the step S603, and the individual-consumer control simulating unit 102 continues simulation. On the other hand, when the process of all pieces of candidate data for the electrical equipment control table 48 completes (step S604: YES), the process progresses to next step S605.

Next, the individual-consumer control optimizing unit 104 selects, among the plural pieces of electrical equipment control table 48 generated in the step S602, one having the minimum total cost evaluation value as the best solution (step S605).

Next, the individual-consumer control optimizing unit 104 stores, in the consumer DB 40, the electrical equipment control table 48 selected as the best solution, and the electrical-equipment-control-table evaluation data 49 calculated through the simulation of that table and including an electricity daily load curve per 30 minutes, an annual electricity bill, a comfort cost evaluation value, an electricity bill cost evaluation value, and a total cost evaluation value through the consumer communication managing unit 101, and transmits those pieces of information to the consumer power operating device 2 (step S606).

Through the foregoing operation, the individual-consumer control optimizing unit 104 is capable of transmitting the best electrical equipment control table 48 to the PC 24 of the consumer power operating device 2 and the demand/supply harmonizing operation client 23 through the consumer communication managing unit 101. The demand/supply harmonizing operation client 23 provides the best electrical equipment control table 48 to the consumer EMS 22, thereby accomplishing a control to the electrical equipment 21 with the effect to the comfort being minimized while accomplishing the annual meter-charge target value.

<Process by Individual-consumer Control Simulating Unit>

Figure 7:
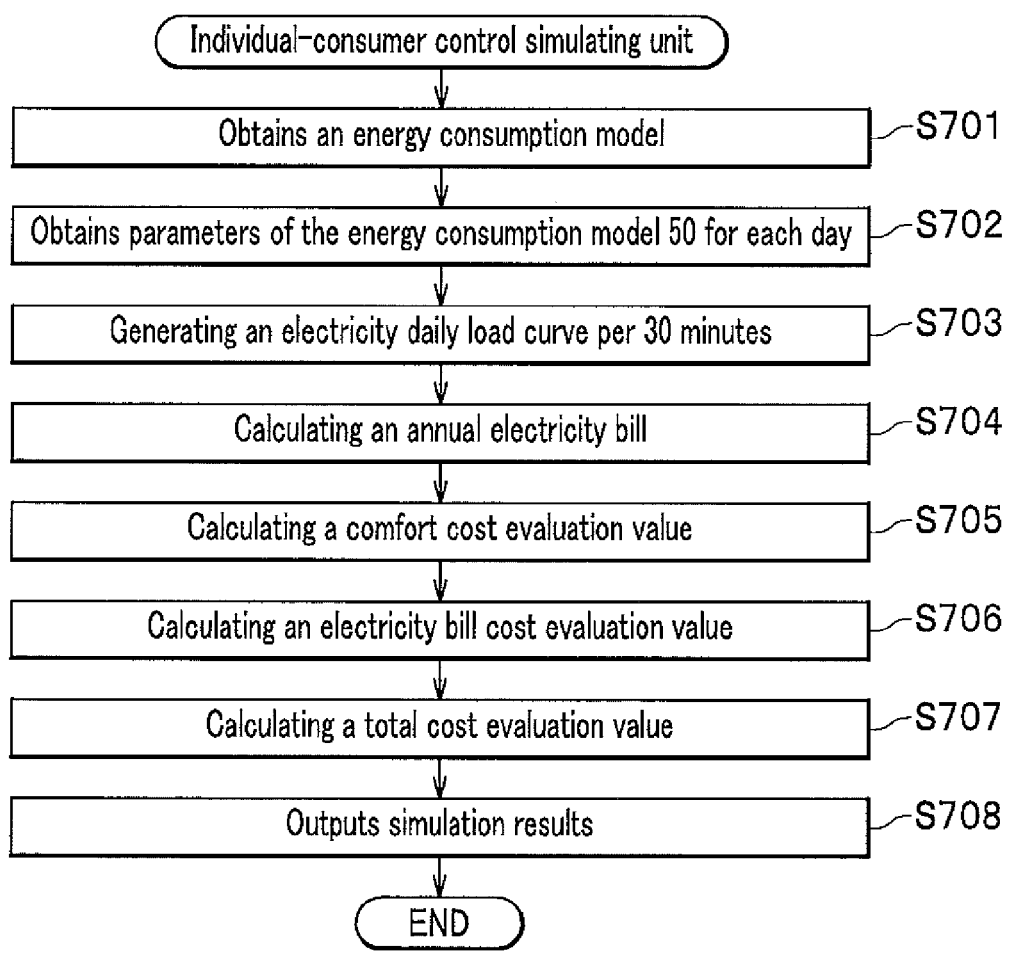
FIG. 7 is a flowchart showing a flow of a process by an individual-consumer control simulating unit in the power demand/supply management server according to the embodiment.

FIG. 7 is a flowchart showing a flow of the process by the individual-consumer control simulating unit 102 in the power demand/supply management server 10 according to this embodiment.

The individual-consumer control simulating unit 102 simulates an electricity daily load curve, an annual electricity bill, a comfort cost evaluation value, an electricity bill cost evaluation value, and a total cost evaluation value for each target consumer when the control contents to the electrical equipment 21 defined in the given electrical equipment control table 48 are executed.

First, the individual-consumer control simulating unit 102 obtains an energy consumption model 50 of the target consumer from the consumer DB 40 (step S701).

More specifically, the individual-consumer control simulating unit 102 obtains the energy consumption model 50 through the consumer LP unit 103. Next, the consumer LP unit 103 executes a process of setting the coefficients of the constitutional formula based on the formula of the energy consumption model 50 like the above-explained (formula 1) using past actual record data on an electrical-equipment control contents at each consumer, a weather condition (an external temperature), an electricity unit meter-charge, and an electricity daily load curve so that the error becomes minimum.

For example, in the case of 48 models predicting the power consumption per 30 minutes in a day, using past actual record data on a power consumption, an external temperature, an air-conditioner set temperature, and an electricity unit meter-charge per 30 minutes, the coefficients in the (formula 1) are set through a regression analysis so that the error becomes minimum. In the case of the (formula 1), the consumer LP unit 103 sets seven coefficients ($a1$, $a2i$, $b1i$, $b2i$, $c1i$, $c2i$, and $di$) for each time division.

Next, the individual-consumer control simulating unit 102 obtains parameters of the energy consumption model 50 for each day in a year (step S702). In the case of the above-explained (formula 1), an external temperature ($ATi$), an air-conditioner set temperature ($ACTi$), and an electricity unit meter-charge ($Pi$) for each time division in the calculation target day are obtained.

The external temperature ($ATi$) is obtained from the weather information server 30 that acquires local weather data represented by location data in the consumer basic information 41 in the consumer DB 40. Also, the air-conditioner set temperature ($ACTi$) is extracted from the given electrical equipment control table 48. When there is no information defined in the electrical equipment control table 48, past electrical equipment control table 48 stored in the consumer DB 40 is referred, an air-conditioner set temperature when the external temperature was similar is extracted, and an average temperature is taken. The electricity unit meter-charge ($Pi$) is obtained by referring to the value defined in the rate plan data during a corresponding period in the applied-rate-plan group data 43.

Subsequently, the individual-consumer control simulating unit 102 puts the coefficient values obtained in the step S701 into respective coefficients of the energy consumption model 50 for each time division 30 minutes by 30 minutes in each day, and substitutes the parameters obtained in the step S702 into the model formula, thereby calculating power consumption for each time division 30 minutes by 30 minutes, and generating an electricity daily load curve per 30 minutes (step S703).

Next, the individual-consumer control simulating unit 102 multiplies the power consumption for each time division of each 30 minutes by the unit charge for each time division of the corresponding period defined in the applied-rate-plan group data 43 based on the electricity daily load curve of each 30 minutes for each day in a year obtained in the step S703 in order to calculate an electricity unit meter-charge for each time division of each 30 minutes, collects the electricity unit meter-charge by what corresponds to a year, thereby calculating an annual electricity bill (step S704).

Thereafter, the individual-consumer control simulating unit 102 runs the equipment control indicated by the electrical equipment control table 48 against the comfort restraint data 471 of the control preference data 47 for each time division of 30 minutes at each day in a year in order to calculate a cost evaluation value relating to the corresponding restraint target, sums up the calculated cost evaluation values by what corresponds to a year, thereby calculating a comfort cost evaluation value (step S705).

Next, the individual-consumer control simulating unit 102 runs the annual electricity bill obtained in the step S704 against the electricity bill restraint data 472 of the control preference data 47 in order to calculate a cost evaluation value relating to the corresponding target excessiveness rate, thereby calculating an electricity bill cost evaluation value (step S706).

Next, the individual-consumer control simulating unit 102 sums up the comfort cost evaluation value obtained in the step S705 with the electricity bill cost evaluation value calculated in the step S706, thereby calculating a total cost evaluation value (step S707).

Thereafter, the individual-consumer control simulating unit 102 outputs simulation results which are an electricity daily load curve per 30 minutes, an annual electricity bill, a comfort cost evaluation value, an electricity bill cost evaluation value, and a total cost evaluation value to the individual-consumer control optimizing unit 104 (step S708).

This allows the individual-consumer control simulating unit 102 to generate electrical-equipment-control-table evaluation data 49 indicating the electricity daily load curve, the annual electricity bill, the comfort cost evaluation value, the electricity cost evaluation value, and the total cost evaluation value when a target consumer executes the control contents to the electrical equipment 21 stored in the electrical equipment control table 48.

The individual-consumer control simulating unit 102 outputs the electrical-equipment-control-table evaluation data 49 to the individual-consumer control optimizing unit 104, and stores such data in the consumer DB 40 through the consumer communication managing unit 101. Also, based on an activation process through the individual-consumer-control-simulating-unit activation screen on the PC 24 of the consumer power operating device 2, the electrical-equipment-control-table evaluation data 49 that is the result of such a process is displayed on the display unit of the PC 24 through the consumer communication managing unit 101.

<Process by Whole-Consumer Optimizing Unit>

Figure 8:
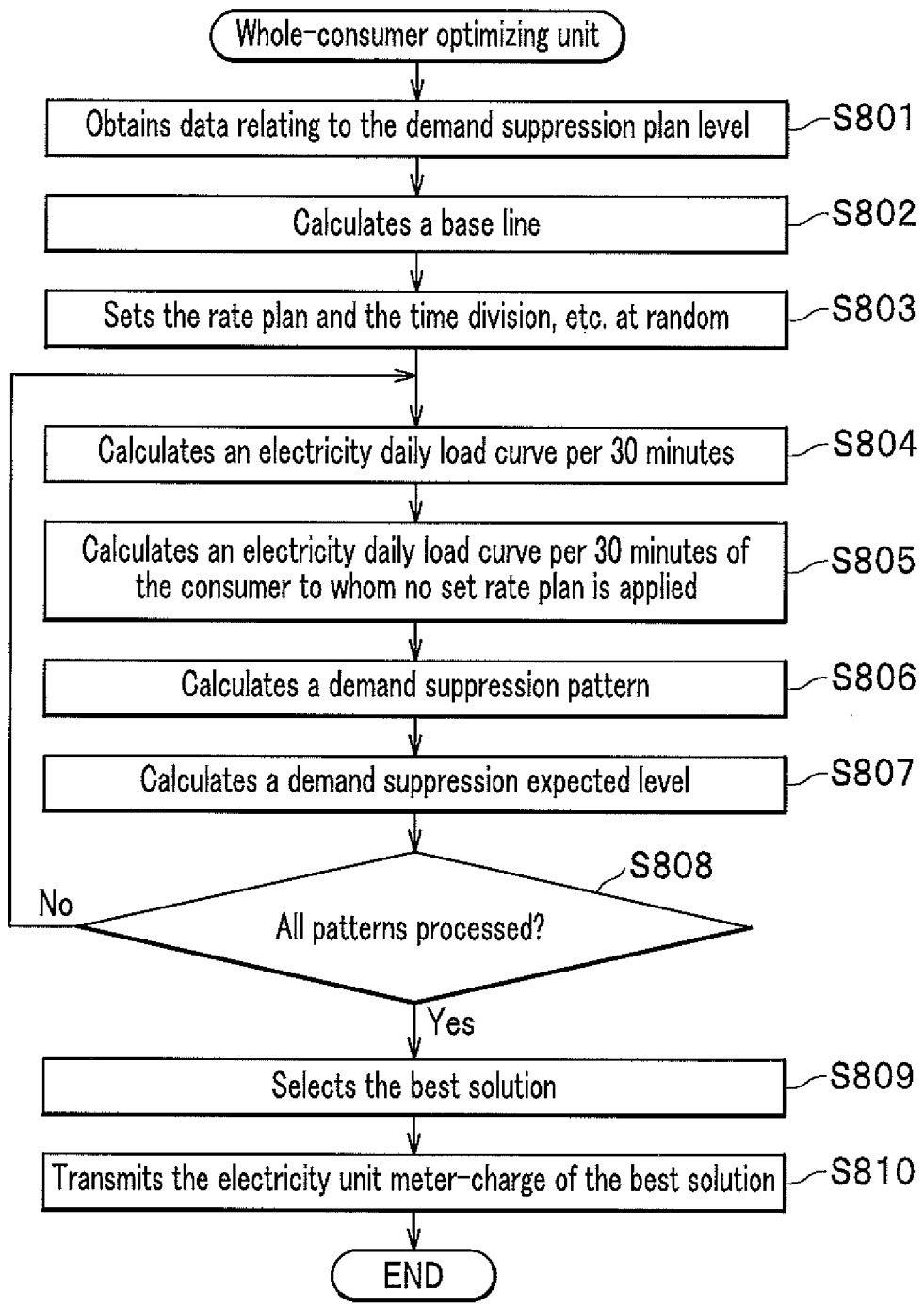
FIG. 8 is a flowchart showing a flow of a process by a whole-consumer optimizing unit in the power demand/supply management server.

FIG. 8 is a flowchart showing a flow of a process by the whole-consumer optimizing unit 105 in the power demand/supply management server 10 according to this embodiment.

The whole-consumer optimizing unit 105 receives information on the demand suppression plan level from the system-operation management server 20 (see FIGS. 1), and calculates the most appropriate electricity unit meter-charge which can ensure the demand suppression plan level of the whole power system at requisite minimum based on the electricity daily load curve of each consumer output by the individual-consumer control simulating unit 102.

First, the whole-consumer optimizing unit 105 obtains data relating to the demand suppression plan level for each demand suppression period and for each hour classification from the system-operation management server 20 through the communication unit 300 (step S801).

Next, the whole-consumer optimizing unit 105 obtains an electricity daily load curve per 30 minutes for each consumer expected as a target of demand suppression with the electricity unit meter-charge of all rate plans remaining same as it is, and synthesizes such electricity daily load curves in order to calculate a base line (step S802).

Next, the whole-consumer optimizing unit 105 sets respective adjustment levels of the rate plan, the time division, and the electricity unit meter-charge which are adjustment targets at random (step S803).

Next, the whole-consumer optimizing unit 105 calculates an electricity daily load curve per 30 minutes of a consumer to whom the set rate plan, etc., is applied (step S804).

In this example, the applied-rate-plan group data 43 of each consumer to whom the rate plan that is the adjustment target is applied is changed to the contents temporarily set in the step S803, and for each corresponding consumer, the process by the individual-consumer control optimizing unit 104 is activated, and an electricity daily load curve per 30 minutes that is the result of such a process is obtained from the individual-consumer control optimizing unit 104.

Because the individual-consumer control optimizing unit 104 calculates an electricity daily load curve per 30 minutes based on the energy consumption model 50 having an electricity unit meter-charge as a parameter through the individual-consumer control simulating unit 102, even if the control preference data 47 is same, an electricity daily load curve per 30 minutes may change.

Next, the whole-consumer optimizing unit 105 calculates an electricity daily load curve per 30 minutes of the consumer to whom no set rate plan is applied (step S805). The electricity daily load curve per 30 minutes of each consumer to whom no rate plan set in the step S803 is applied is obtained by activating the process by the individual-consumer control optimizing unit 104 like the daily load curve per 30 minutes calculated in the step S804.

Thereafter, the whole-consumer optimizing unit 105 synthesizes the electricity daily load curves per 30 minutes of individual consumers calculated in the steps S804 and S805 for each consumer expected as the demand suppression target, and calculates a demand suppression pattern that is the synthesized electricity daily load curve (step S806).

Next, the whole-consumer optimizing unit 105 calculates a demand suppression expected level (step S807). A difference between the demand suppression pattern calculated in the step S806 and the base line calculated in the step S802 is calculated as the demand suppression expected level. The demand suppression expected level calculated in this step is data per 30 minutes.

Next, the whole-consumer optimizing unit 105 determines whether or not a process completes for all patterns which are subjected to adjustment set in the step S803 (step S808).

When the process for all patterns does not complete yet (step S808: NO), the process returns to the step S804 and the process is repeated. On the other hand, when the process for all patterns completes (step S808: YES), the process progresses to next step S809.

Next, in the step S809, the whole-consumer optimizing unit 105 selects, as the best solution, an electricity unit meter-charge of a pattern having a demand suppression expected level for each classification hour within the demand suppression period exceeding the demand suppression plan level and having a demand-suppression-expected-level total level within the demand suppression period exceeding the demand-suppression-plan-level total level at minimum (step S809).

Thereafter, the whole-consumer optimizing unit 105 transmits information including the electricity unit meter-charge selected as the best solution to the consumer power operating device 2 through the consumer communication managing unit 101 (step S810).

As explained above, the whole-consumer optimizing unit 105 calculates the most appropriate electricity unit meter-charge that can ensure a necessary demand suppression plan level throughout the whole power system. The information on that electricity unit meter-charge is transmitted and applied to each consumer power operating device 2, thereby allowing the utility company to realize and ensure the most appropriate demand suppression plan level throughout the whole power system.

As explained above, according to the power demand/supply management server 10 and the power demand/supply management system 4 of this embodiment, the individual-consumer control optimizing unit 104 simulates an electricity daily load curve based on a change in the control contents to the electrical equipment 21, a weather condition, and an electricity unit meter-charge, so that the control contents to the electrical equipment 21 can be changed in such a way that the effect to the comfort becomes minimum while ensuring an electricity bill target value at each consumer.

Also, at the utility company, it is possible to predict a power demand suppression level when a CPP event happens by the whole-consumer optimizing unit 105, and the utility company can set an electricity unit meter-charge appropriate for ensuring the demand suppression plan level of the whole power system at requisite minimum.

The explanation was given of a case in which according to the power demand/supply management system 4 of this embodiment, the system-operation management server 20 sets a demand suppression plan level beforehand, such a demand suppression plan level is given to the whole-consumer optimizing unit 105 of the power demand/supply management server 10, and the whole-consumer optimizing unit 105 adjusts the electricity unit meter-charge of the rate plan so as to ensure the demand suppression plan level at requisite minimum.

However, according to the power demand/supply management system 4 of a modified example of this embodiment, the system-operation management server 20 may set a demand suppression plan level through the following operations.

First, the whole-consumer optimizing unit 105 sets plural change plans that adjust the electricity unit meter-charge of the rate plan, and for each plan, a demand suppression expected level is obtained through the same processes from the step S804 to the step S807 shown in FIG. 8. Next, the whole-consumer optimizing unit 105 obtains a change level of the total of the electricity unit meter-charges of all consumers in this case as a demand suppression cost, generates a demand suppression cost table having the demand suppression cost and a demand suppression expected level in association with each other, and transmits such a table to the system-operation management server 20. Using the received demand suppression cost table, the system-operation management server 20 sets a demand suppression plan level so that a total cost obtained by summing a demand suppression cost when the demand suppression expected level is increased and an electricity generation cost when the electric generating capacity is increased becomes minimum, and the set demand suppression plan level is given to the whole-consumer optimizing unit 105 of the power demand/supply management server 10.

This allows the system-operation management server 20 to set the most appropriate demand suppression plan level including the electricity generating cost by an electricity generator. The power demand/supply management server 10 obtains the demand suppression plan level from the system-operation management server 20, and causes the whole-consumer optimizing unit 105 to set an electricity unit meter-charge.

Description of Reference Numerals

1 Power management device
2 Consumer power operating device
3 Communication network
4 Power demand/supply management system
10 Power demand/supply management server
20 System-operation management server
21 Electrical equipment
22 Consumer EMS
23 Demand harmonizing operation client
24 PC
25 Meter-reading terminal device
30 Weather information server
40 Consumer DB
60 Communication server
70 Meter-reading server
100 Control unit
101 Consumer communication managing unit (communication managing unit)
102 Individual-consumer control simulating unit (control simulating unit)
103 Consumer LP unit
104 Individual-consumer control optimizing unit
105 Whole-consumer optimizing unit
200 Input/output unit
300 Communication unit
400 Memory unit

What is claimed is:

1. A power demand/supply management server which is connected to a plurality of power operating devices that control electrical equipment through a communication network and which distributes control information defining control contents for the electrical equipment to the power operating device, the power demand/supply management server comprising:
   a memory unit that stores a predetermined energy consumption model for predicting an electricity daily load curve indicating an electrical power consumption per predetermined time using parameters which are control-target equipment information of the power managing device, applied-rate-plan group information indicating an electricity unit meter-charge applied to the power operating device and an applied period of the electricity unit meter-charge, and control contents to the electrical equipment and a weather condition;
   information obtaining unit that obtains control preference information including cost evaluation values which are barometers indicating a compatibility of restraint conditions to a comfort and an electricity bill for each consumer, the comfort and the electricity bill being set and input by the power operating device;

a control simulating unit which obtains the energy consumption model from the memory unit in order to calculate the electricity daily load curve, and which simulates a total cost evaluation value that is a total of the cost evaluation values for the comfort and the electricity bill for a predetermined period using the calculated electricity daily load curve, the applied-rate-plan group information stored in the memory unit and the obtained control preference information;

an individual-consumer control optimizing unit which obtains the control-target equipment information from the memory unit, generates a plurality of candidate data having the control contents to the electrical equipment changed and set, instructs the control simulating unit to perform simulation on the plurality of generated candidate data, selects the control contents to the electrical equipment so that the total cost evaluation value becomes minimum among the plurality of candidate data as a result of the simulation, and generates the electrical equipment control information based on the selected control contents; and a transmitting unit that transmits the generated electrical equipment control information to the power operating device.

2. The power demand/supply management server according to claim 1, further comprising a consumer LP (Load Profiling) unit which calculates, as coefficients of the parameters defined by the energy consumption model, values in which an error becomes minimum through a regression analysis based on past actual record data of the parameters and the electricity daily load curve using the predetermined energy consumption model stored in the memory unit, and generates an energy consumption model for each consumer.

3. The power demand/supply management server according to claim 2, wherein the control simulating unit obtains the energy consumption model for each consumer generated by the consumer LP unit, calculates the electricity daily load curve per predetermined time at each day in a year using the energy consumption model, calculates an annual electricity bill by multiplying the calculated electricity daily load curve by an electricity unit meter-charge for each time division in the applied period based on the obtained applied-rate-plan group information, calculates an electricity bill cost evaluation value by checking the annual electricity bill and the obtained cost evaluation value of the electricity bill, calculates a comfort cost evaluation value by checking the control contents to the electrical equipment and the obtained cost evaluation value of the comfort, and sums up the electricity bill cost evaluation value and the comfort cost evaluation value, thereby calculating the total cost evaluation value.

4. The power demand/supply management server according to claim 1, wherein a system-operation management server that manages and operates an electricity generator is further connected to the communication network, the power demand/supply management server further comprises a whole-consumer optimizing unit which receives information on a demand suppression plan level from the system-operation management server, obtains the electricity daily load curve for each consumer calculated by the control simulating unit upon instruction by the individual-consumer control optimizing unit, and calculates a minimum electricity unit meter-charge that ensures a demand suppression plan level necessary as a whole power system, and the whole-consumer optimizing unit transmits information on the minimum electricity unit meter-charge to the power operating device through the transmitting unit.

5. The power demand/supply management server according to claim 4, wherein the whole-consumer optimizing unit obtains the electricity daily load curve for each consumer calculated by the control simulating unit upon instruction by the individual-consumer control optimizing unit, synthesizes obtained individual electricity daily load curves in order to generate a demand suppression pattern, calculates, as a demand suppression expected level, a difference between the generated demand suppression pattern and an electricity daily load curve for each consumer calculated based on a current electricity unit meter-charge, selects a pattern so that the demand suppression expected level for each hour within a demand suppression period exceeds the demand suppression plan level and a demand-suppression-expected-level total level within the demand suppression period minimally exceeds a demand-suppression-plan-level total level within the demand suppression period, and calculates the electricity unit meter-charge.

6. A power supply management system comprising a plurality of power operating devices that control electrical equipment, a power demand/supply management server that distributes control information defining control contents for the electrical equipment to the power operating device, and a system-operation management server that manages an electricity generator, the plurality of power operating devices, the power demand/supply management server, and the system-operation management server being connected one another through a communication network, the power supply management server comprising:

a memory unit that stores a predetermined energy consumption model for predicting an electricity daily load curve indicating an electrical power consumption per predetermined time using parameters which are control-target equipment information of the power managing device, applied-rate-plan group information indicating an electricity unit meter-charge applied to the power operating device and an applied period of the electricity unit meter-charge, and control contents to the electrical equipment and a weather condition;

information obtaining unit that obtains control preference information including cost evaluation values which are barometers indicating a compatibility of restraint conditions to a comfort and an electricity bill for each consumer, the comfort and the electricity bill being set and input by the power operating device;

a control simulating unit which obtains the energy consumption model from the memory unit in order to calculate the electricity daily load curve, and which simulates a total cost evaluation value that is a total of the cost evaluation values for the comfort and the electricity bill for a predetermined period using the calculated electricity daily load curve, the applied-rate-plan group information stored in the memory unit and the obtained control preference information;

an individual-consumer control optimizing unit which obtains the control-target equipment information from the memory unit, generates a plurality of candidate data having the control contents to the electrical equipment changed and set, instructs the control simulating unit to perform simulation on the plurality of generated candidate data, selects the control contents to the electrical equipment so that the total cost evaluation value becomes minimum among the plurality of candidate data as a result of the simulation, and generates the electrical equipment control information based on the selected control contents;

a whole-consumer optimizing unit which receives information on a demand suppression plan level from the system-operation management server, obtains the electricity daily load curve for each consumer calculated by the control simulating unit upon instruction by the individual-consumer control optimizing unit, and calculates a minimum electricity unit meter-charge that ensures a demand suppression plan level necessary as a whole power system; and a transmitting unit that transmits the generated electrical equipment control information and information on the minimum electricity unit meter-charge applied to the power operating device to the power operating device.

7. The power supply management system according to claim 6, wherein the whole-consumer optimizing unit of the power supply management server obtains the electricity daily load curve for each consumer calculated by the control simulating unit upon instruction by the individual-consumer control optimizing unit, synthesizes obtained individual electricity daily load curves in order to generate a demand suppression pattern, calculates, as a demand suppression expected level, a difference between the generated demand suppression pattern and an electricity daily load curve for each consumer calculated based on a current electricity unit meter-charge, selects a pattern so that the demand suppression expected level for each hour within a demand suppression period exceeds the demand suppression plan level and a demand-suppression-expected-level total level within the demand suppression period minimally exceeds a demand-suppression-plan-level total level within the demand suppression period, and calculates the electricity unit meter-charge.

8. The power supply management system according to claim 7, wherein the whole-consumer optimizing unit of the power supply management server calculates the demand suppression expected level of the whole consumers when the electricity unit meter-charge is changed, calculates, as a demand suppression cost, a change amount in a total of electricity unit meter-charge in the changed electricity unit meter-charge, generates demand suppression cost information including the demand suppression expected level and the demand suppression cost in association with each other, and transmits the generated demand suppression cost information to the system-operation management server, and the system-operation management server sets the demand suppression plan level so that a total cost of the demand suppression cost when the demand suppression expected level is increased and an electricity generating cost when an electric generating capacity of the electricity generator is increased becomes minimum based on the demand suppression cost information obtained from the whole-consumer optimizing unit, and transmits information on the set demand suppression plan level to the whole-consumer optimizing unit of the power supply management server.

* * * * *